Figure 1:
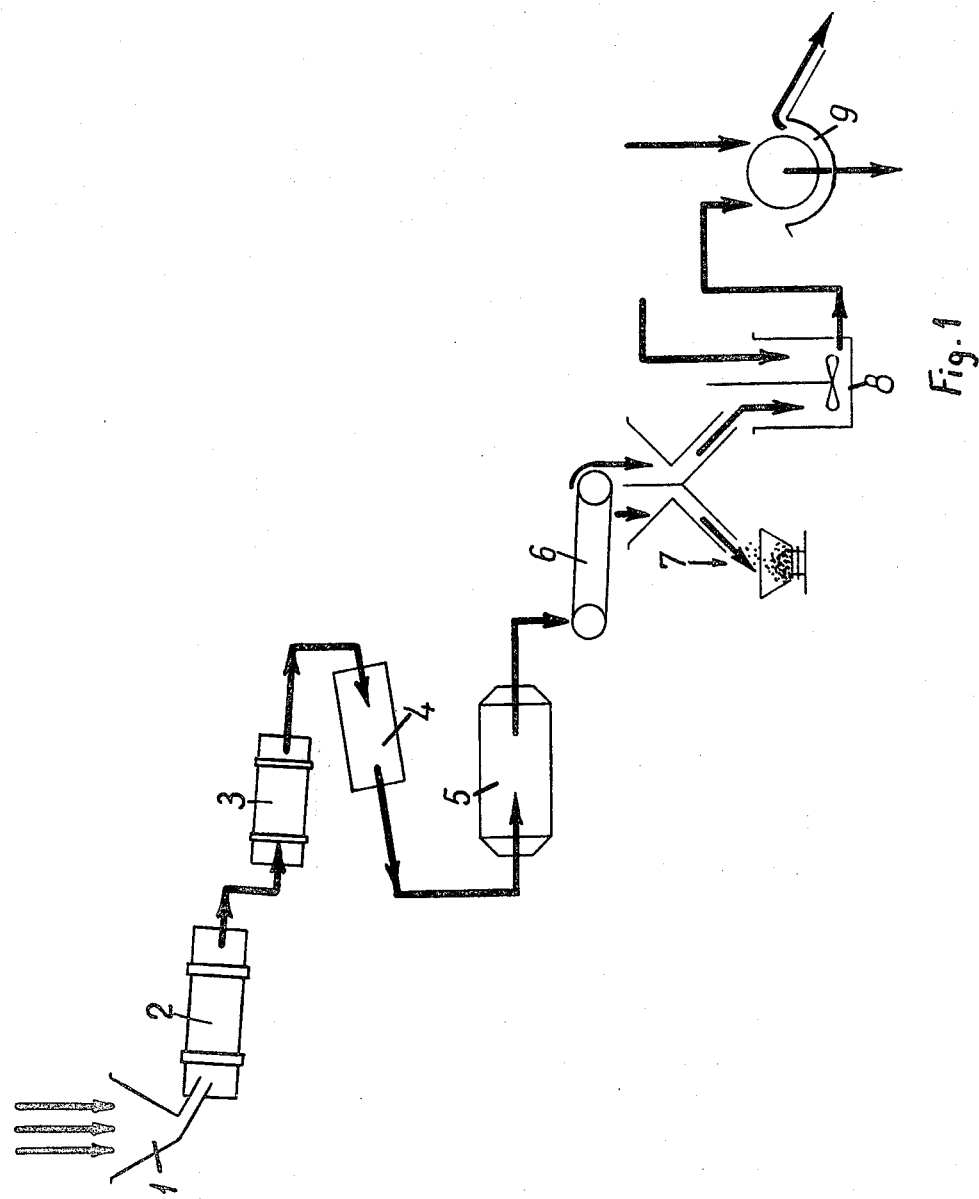

United States Patent [19]

Dobos et al.

[11] 3,989,513
[45] Nov. 2, 1976

[54] METHOD FOR THE TREATMENT OF RED MUD

[75] Inventors: György Dobos; Zoltán Felföldi; Gyula Horváth, all of Budapest; György Kaptay, Almasfuzito; Zoltán Osvald; Károly Solymár, both of Budapest, all of Hungary

[73] Assignee: Magyar Aluminiumipari Troszt, Budapest, Hungary

[22] Filed: Mar. 11, 1975

[21] Appl. No.: 557,341

Related U.S. Application Data

[63] Continuation of Ser. No. 366,697, June 4, 1973, abandoned.

[30] Foreign Application Priority Data

June 6, 1972  Hungary .......................... MA 2364

[52] U.S. Cl. ................................ 75/30; 75/101 R; 423/119
[51] Int. Cl.² .......................................... C21B 5/04
[58] Field of Search ............... 75/21, 24, 28, 29, 30, 75/33, 38, 101 R, 40; 423/119, 111, 131, 137

[56] References Cited
UNITED STATES PATENTS

| | | | |
|---|---|---|---|
| 2,408,241 | 9/1946 | Sturbelle | 75/101 R |
| 2,830,892 | 4/1958 | Udy | 75/31 X |
| 2,964,383 | 12/1960 | Kamlet | 75/30 X |
| 3,094,378 | 6/1973 | Wolf | 75/101 R X |
| 3,211,524 | 10/1965 | Hyde et al. | 75/101 R X |
| 3,295,961 | 1/1967 | Colombo et al. | 75/101 R |
| 3,495,973 | 2/1970 | Ban | 75/33 X |
| 3,776,717 | 12/1973 | Kapolyi et al. | 73/38 |
| 3,876,749 | 4/1975 | Horvath et al. | 423/119 |

Primary Examiner—M. J. Andrews

[57] ABSTRACT

Disclosed is a method for the treatment of the red mud byproduct of the Bayer aluminum process, wherein limestone, hydrated lime or other CaO-containing material is added to the red mud in certain molar proportions to the ingredients of the red mud, then the mixture is further mixed with a reducing agent, and the entire mixture is subjected to a reducing heat treatment during the course of which the mix becomes softened or molten. The iron and the slag are separated from each other while the mix is still molten, or after it has been cooled, and then the Na and Al-content of the slag is extracted with a sodium carbonate solution containing a caustic, or with a sodium carbonate solution and a solution of a caustic in two steps.

7 Claims, 3 Drawing Figures

METHOD FOR THE TREATMENT OF RED MUD

This application is a continuation of Ser. No. 366,697, filed June 4 1973, now abandoned.

The present invention relates to the treatment of the red mud by product of the Bayer process for the manufacture of aluminum. More particularly the invention relates to a reduction treatment of the red mud to obtain raw iron and a slag, whereby the latter contains sodium aluminate and calcium aluminate which can be directly leached out therefrom.

In accordance with the process of Hungarian Pat. No. 154,125 iron is produced by the reduction of red mud. The physico-chemical properties of the slag which is formed in that process, are adjusted by the addition of materials containing CaO and/or $Al_2O_3$. After magnetic separation of the iron the $Na_2O$ and $Al_2O_3$—content of the slag is recovered by sintering with Ca and Na carbonates. It is a drawback of this prior art process that production of iron and leachable slag requires two heat treatments.

A number of processes are known for the production of iron from red mud. In accordance with one known process a low concentration of $Na_2O$—containing red mud is used to prepare a self-disintegrating Ca-aluminate slag which can be leached out by means of a soda solution. A drawback of this process is that the $Na_2O$ content of the red mud is not recovered.

In accordance with another known process the red mud is melted and the iron which is recovered in a molten form is subsequently treated, desulfurized, dephosphorized and the carbon is added. A drawback of this process is that the $Na_2O$ and $Al_2O_3$-content of the slag cannot be utilized.

In the known methods for the utilization of red mud, the Na-and Al-silicates contained therein are substantially decomposed in the presence of large amounts of calcium carbonate and reducing agents, thus the $Na_2O$ content of the red mud is lost during the heat treatment. Therefore, the recovery of iron and $Na_2O$ and $Al_2O_3$ is generally carried out in two steps: first the red mud portion is reduced without calcium carbonate having been added and the raw iron is produced; in the next step the molten slag from which the iron was separated, and which contains only minimal calcium, is treated with limestone to obtain an easily leachable slag.

It is an objective of the process of the present invention to provide a process which permits the recovery of the $Fe_2O_3$, $Al_2O_3$ and $Na_2O_3$ content of red mud in a single heat treatment, to a substantially full extent, which was heretofore not possible with the prior art processes. It is a further advantage of the process of the present invention that the materials whch cooled after the heat treatment do not have to be reheated again.

The basis of the present invention is the discovery that the decomposition of sodium aluminate which was formed by decomposing Na-Al silicates with sufficient amounts of CaO, can be retarded under circumstances to be described below, so that the losses of $Na_2O$ —contrary to expectations can be reduced to about 30 – 40 %.

In accordance with the present invention the red mud byproduct of aluminum manufacture by the Bayer process is subjected to a reducing heat treatment. During the course of this treatment the red mud is melted together with additives, the iron formed during the reduction is separated from the slag and, finally, the slag is crushed and its $Na_2O$ and $Al_2O_3$ contents is leached out. Prior to the treatment lime, limestone or other CaO-containing material is added to the red mud in the following molar proportions:

$$\frac{CaO}{SiO_2} = 1.8 \text{ to } 2.2 \quad \frac{CaO}{TiO_2} = 0.9 \text{ to } 1.1$$

$$\frac{CaO}{Fe_2O_3} = 1.8 \text{ to } 2.2 \quad \frac{CaO}{Al_2O_3 \cdot Na_2O} = 0 \text{ to } \frac{12}{7}$$

The additive is based on the weight of the red mud. After the addition the mixture is melted in a single reducing heating step. After the separation of the slag, the cominuted slag which contains sodium aluminate and calcium aluminate, is leached out either in two steps, first with a solution of a caustic base and then with a solution of sodium carbonate, or in a single step with a sodium carbonate solution which also contains a caustic base.

The reducing heat treatment is suitably carried out in a short period of time, such as 20 minutes. The iron and the slag can be separated from each other in the molten state or by magnetic separation after solidification.

The process of the present invention is suitably carried out by the use of two furnaces which are connected in series in a closed system. The first furnace, suitably a rotary kiln, accomplishes the reduction of the starting material at a temperature under the softening point of the starting material, generally under 1,200° C. The second furnace completes the melting of the material at a temperature of about from 1,200° C to about 1,600° C.

It has been observed in the course of experiments that the stability of sodium-aluminate decreases with an increase in the duration of the heat treatment and an increase in the excess of CaO and coke which is employed in the reduction. It has been also determined that if the reduction and the melt formation are carried out in a closed system then the $Na_2O$ vapors will condense at the colder portions of the system, suitably at the colder end of the reducing kiln. Then this component reenters the reaction mix and enters into a reaction therewith thereby to minimize $Na_2O$ losses due to such recirculation of this ingredient. It has also been demonstrated by experimental proof that $Na_2O$ losses increase as the volatile content of the reducing agent increases. Therefore, one should suitably employ reducing agents having a low volatile content.

The employment of a closed furnace system in accordance with the process of the present invention, also provides for a more favorable thermal efficiency. The melting furnace or any furnace portion in which melt formation occurs, is suitably provided with a basic refractory lining, such as magnesite, dolomite or chrome-magnesite, or a firebrick base.

Thus in the melting of a starting material which contains appropriate amounts of CaO, one can obtain in a single step from red mud iron particles and/or raw iron, as well as a slag which contains Na-aluminate and Ca-aluminates which can then be leached out.

The $Na_2O$ content of the red mud is generally sufficient to permit formation of $Na_2Al_2O_4$, therefore, the amount of CaO which is to be added is calculated only for the formation of dicalcium silicate and calcium titanite and of dicalcium ferrite ($Ca_2Fe_2O_5$), and CaO is added only in proportion of that $Al_2O_3$ which is not to be bound by available $Na_2O$, thus to form a calcium aluminate with the composition corresponding to $Ca_{12}Al_{14}O_{33}$.

The process of the present invention can be particularly advantageously carried out in the case of red muds containing over 5% $Na_2O$.

Figure 2:
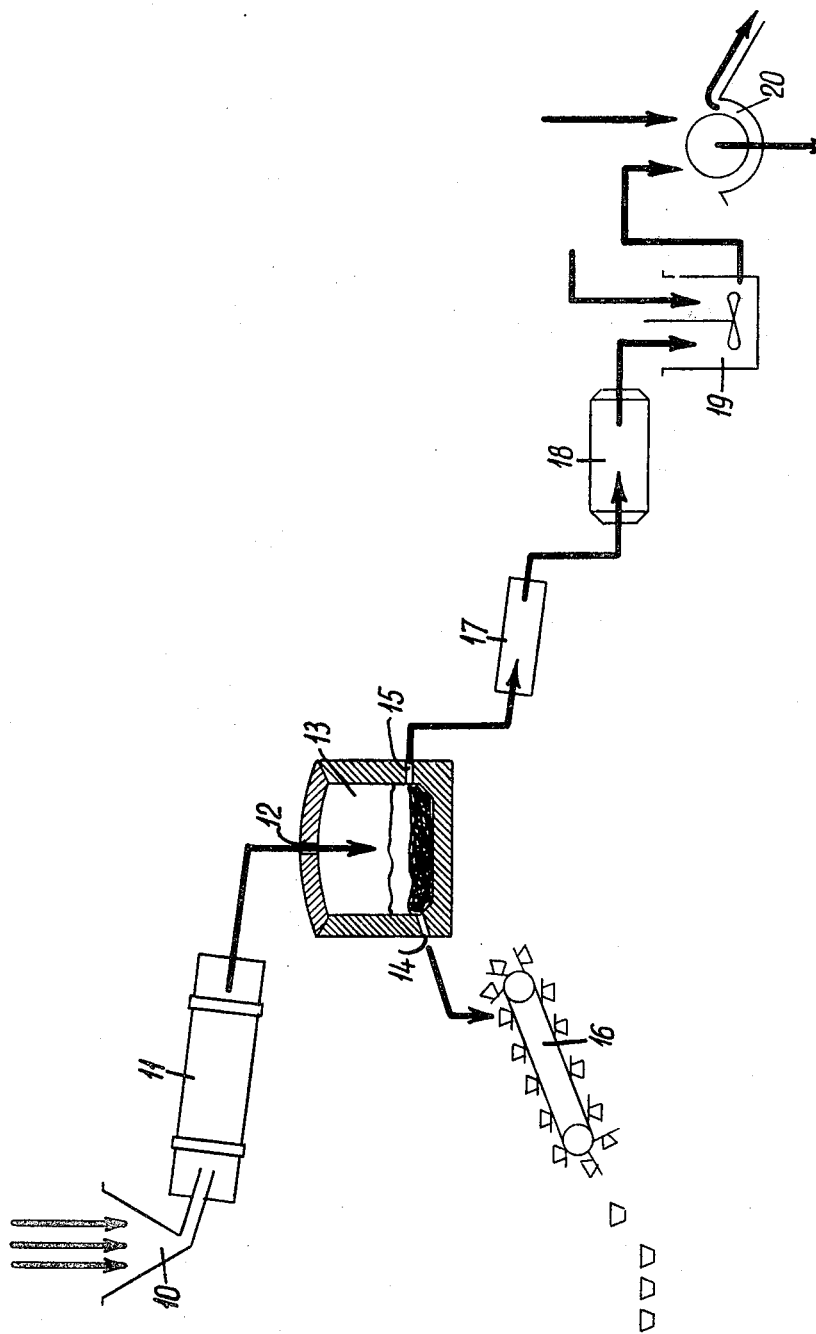
Figure 3:
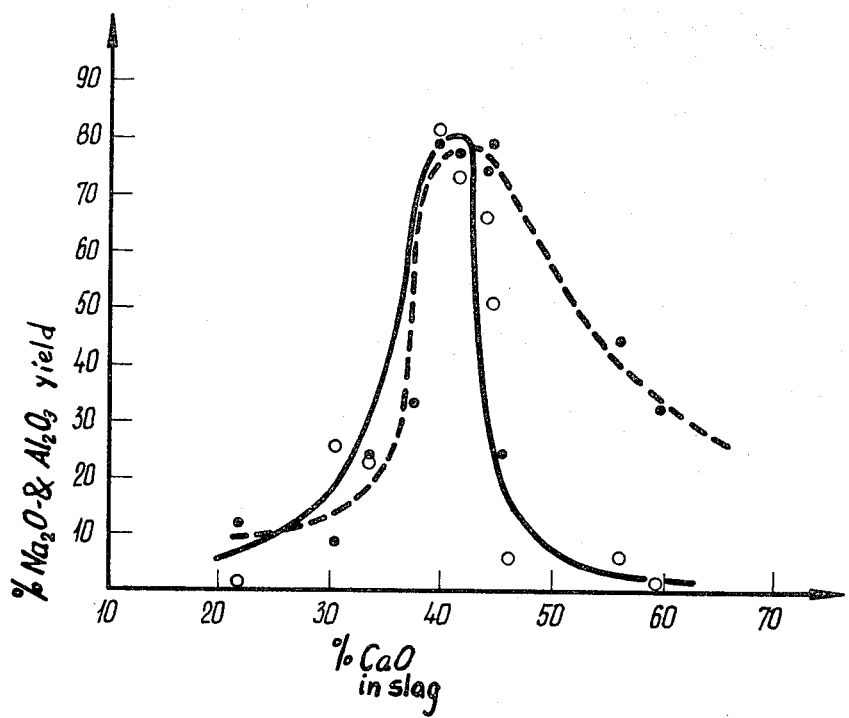

The process of the present invention is disclosed in greater detail, with reference being had to the accompanying drawing, wherein FIG. 1 and FIG. 2 show different embodiments of the process, and FIG. 3 illustrates yields of $Na_2O$ and $Al_2O_3$ obtained in the leaching of slags containing varying amounts of CaO.

At about 1,200° to 1,350° C where the starting material will form a melt particulate iron can be obtained by the Krupp-Renn technique. This iron can be magnetically separated after the product is cooled. Above about 1,350° C where the entire starting material will thoroughly melt molten iron is obtained which can be recovered by casting into molds or subjected to aftertreatment for the manufacture of steel.

In accordance with the embodiment of the present invention which is shown in FIG. 1, the heat treatment is carried out at a lower temperature between about 1,200° C and about 1,350° C. The slag in this case is not completely molten, but only softened. Red mud, mixed with limestone and reducing agent is fed from a hopper 1 into a reducing kiln 2, from where it reaches a melting furnace 3. The softened material is cooled in a cooling device 4 and cominuted in a screening ball mill 5. The slag is separated from the particulate iron by a magnetic separator 6 and the separated components are recovered in separate storage bunkers 7. The slag is leached in leaching equipment 8 with a caustic and/or sodium carbonate solution. The slurry is filtered on a filter 9 and the so called grey mud solids are washed. The caustic aluminate solution is suitably reused in the Bayer aluminum process while the resulting solids can be used in the manufacture of portland cement.

The embodiment of the process of the present invention which is illustrated in FIG. 2 differs from the embodiment shown in FIG. 1, that here a higher temperature, suitably from about 1,350° C to about 1,600° C is employed. Thus completely molten iron and slag are obtained which can be easily separated from each other by appropriate tapping procedures, thus eliminating the need for magnetic separation. However, in this embodiment it is necessary to provide suitable melting equipment.

Accordingly, as shown in FIG. 2, the starting mix comprising red mud, limestone and a reducing agent are fed by a feeder 10 into a reducing kiln 11, from where the reduced material is fed through a feeder opening 12 into a melting furnace 13 where it becomes molten. The molten steel is tapped through an orifice 14 and the slag through an orifice 15. The molten steel is cast into ingots by casting equipment 16. The molten slag is cooled in a cooler 17 and is cominuted in a screening ball mill 18. The crushed slag is leached out in leaching equipment 19, from which the slurry is fed onto a filter 20 where the solids and the caustic solution are separated. The grey mud and the caustic aluminate solution can be utilized, as outlined in connection with the embodiment of FIG. 1 hereof, in the Bayer process and in the cement industry.

In FIG. 3 various leaching results are shown in connection with a red mud having the composition disclosed in Table 1 hereof. The same red mud was mixed with identical proportions of reducing agent but varying amounts of limestone. The mix was molten at about 1,400° C and the slag was uniformly leached. Best yields were obtained, as shown on FIG. 3, when the slag contained about 40% CaO.

It can be determined from FIG. 3 that the best results are obtained when sufficient amounts of limestone are added to the red mud to form sodium aluminate, dicalcium silicate, calcium titanate and dicalcium ferrite. Even in this case there will be some loss of $Na_2O$ and thus the $Al_2O_3$ which will not have sufficient $Na_2O$ available for combination therewith, will join the dicalcium silicate to form gehlenite ($Ca_2Al_2SiO_7$). This mineral will not dissolve in the sodium carbonate solution and thus not only $Na_2O$, but also $Al_2O_3$ will also be lost.

As less limestone is added the loss of $Na_2O$ also becomes lower, but the Na—Al silicate will then only partially decompose and less $Na_2Al_2O_4$ will be formed.

If more limestone is added than the stoichiometrical requirement, then the excess will cause the evaporation of more $Na_2O$ than the CaO which is required for converting the $Al_2O_3$ which remained without $Na_2O$, into $Ca_{12}Al_{12}O_{33}$, thus the amount of gehlenite increases and results in the loss of $Al_2O_3$.

Thus, if one adds to the red mud only the stoichiometrically required amount of CaO, and the other conditions that are required to carry out the process of the present invention, are observed, then about 84% of the $Fe_2O_3$ content of the red mud can be recovered when iron particles are formed, while 90% of the ferric oxide can be recovered when the molten iron-forming method is used. Furthermore, 80% of the $Al_2O_3$ content and 60–70% of the $Na_2O$ content of the red mud can be recovered with the single step heat treatment.

The following examples further illustrate the process of the present invention without any limitation of its scope.

EXAMPLE 1

Red mud is processed with the process embodiment of the present invention shown in FIG. 1. 1.5 tons/hr red mud, limestone and anthracite are added in a mixture to a 20 m rotary kiln. The red mud contains 35% moisture and the amount of the limestone is 57.7% based on the dry red mud and of the anthracite 20% based on the dry red mud. The particle sizes of the ingredients do not exceed 3 mm. The material is reduced and softened at 1,300° C, subsequently it is cooled, crushed and subjected to magnetic separation. The following Table I. shows the composition of the resulting slag.

Table 1.

| component | in red mud % | in slag % | in leached mud % |
|---|---|---|---|
| Fe | — | 1.1 | 1.5 |
| FeO |  | 5.2 | 6.9 |
| $Fe_2O_3$ | 39.5 | — | — |
| $Al_2O_3$ | 16.5 | 19.4 | 5.4 |
| $SiO_2$ | 13.0 | 15.3 | 20.2 |
| $Na_2O$ | 10.1 | 10.2 | 2.5 |
| CaO | 1.3 | 38.2 | 49.8 |
| MgO | 1.1 | 1.3 | 1.7 |
| MnO | 0.2 | 0.2 | 0.3 |
| $TiO_2$ | 6.5 | 7.7 | 10.1 |
| $SO_3$ | 1.1 | 1.3 | 1.7 |
| Ign. loss etc. | 9.8 | — | — |

The composition of the slag and of the leached out mud above, were recalculated to 0% ignition loss. On the basis of the results the iron particles contain 84% of the iron content of the red mud, while 15% of Na$_2$O volatilized as lost. The composition of the leached out mud is also shown in Table I.

The following are yields calculated from the mud composition:

|  |  |
|---|---|
| from the slag | Na$_2$O = 81.7% |
|  | Al$_2$O$_3$ = 78.9% |
| from the red mud | Na$_2$O = 69.5% |
|  | Al$_2$O$_3$ = 78.9% |
|  | Fe$_2$O$_3$ = 84.0% |

EXAMPLE 2

The same starting material as used in Example 1, is also used in Example 2 which is carried out in accordance with the embodiment of the present invention illustrated in FIG. 2. Reduction is carried out in the rotary kiln at 900° C – 1,100° C and then is rapidly melted in a furnace at 1,350° C – 1,600° C. Even though the melting temperature which is employed in this example is higher than the temperatures employed in Example 1, the Na$_2$O losses are comparable because some of the Na$_2$O condenses in the rotary kiln from the combustion gases and returns to the process.

In the case of melting, a higher yield of Fe$_2$O$_3$ is obtained, about 90%, while a lower yield of Na$_2$O (about 25%) is obtained due to the higher melting temperature, and thus the Al$_2$O$_3$ yield is also reduced.

The useful components which are obtainable from the red mud are:

Na$_2$O = 61.2 %
Al$_2$O$_3$ = 69.5 %
Fe$_2$O$_3$ = 90.0 %

All percentages are by weight throughout.
We claim:

1. In a method for the treatment of the red mud byproduct of aluminum manufacture said red mud containing Fe$_2$O$_3$, Al$_2$O$_3$, Na$_2$O, SiO$_2$ and TiO$_2$, wherein the red mud is subjected to a reducing heat treatment with an added reducing agent during the course of which said red mud is molten, the iron and slag that are formed are separated from each other, and subsequently leaching out the Na and Al contents of the solidified slag, the improvement in combination therewith comprising adding to the red mud which contains more than 5% Na$_2$O a CaO-containing ingredient in the following molar ratios and based on the weight of dry red mud $$\frac{CaO}{SiO_2} = 1.8 - 2.2;  \quad \frac{CaO}{TiO_2} = 0.9 - 1.1$$

$$\frac{CaO}{Fe_2O_3} = 1.8 - 2.2; \quad \frac{CaO}{Al_2O_3 - Na_2O} = 0 - \frac{12}{7}$$

carrying out the reducing heat treatment and then leaching the Na and Al-contents of the solidified slag with a caustic solution and sodium carbonate, the entire process requiring only a single reducing heat treatment.

2. The process of claim 1, further comprising the adding of a reducing agent to the red mud before said heat treatment.

3. The process of claim 1, wherein said reducing heat treatment is carried out rapidly, within 20 minutes.

4. The process of claim 1, wherein after solidification iron is separated from the slag by magnetic separation.

5. The process of claim 1, wherein the iron and slag are separated from each other while molten.

6. The process of claim 1, wherein the Na and Al contents of the slag are leached in a single step with a sodium carbonate with caustic solution.

7. The process of claim 1, wherein the Na and Al contents of the slag are leached in a plurality of steps, with a caustic solution and then with a sodium carbonate solution.

* * * * *